United States Patent [19]

Fortune et al.

[11] Patent Number: 4,960,190
[45] Date of Patent: Oct. 2, 1990

[54] FLUID PRESSURE CLUTCH

[75] Inventors: David J. Fortune, Bath; David E. Wright, Wiltshire, both of United Kingdom

[73] Assignee: 501 British Autogard Limited, Meysey Hampton, England

[21] Appl. No.: 251,133

[22] Filed: Sep. 29, 1988

Related U.S. Application Data

[63] Continuation-in-part of Ser. No. 209,963, Jun. 22, 1988, abandoned, which is a continuation-in-part of Ser. No. 106,629, Oct. 8, 1987, abandoned.

[30] Foreign Application Priority Data

Oct. 1, 1987 [GB] United Kingdom ............... 8723038
May 25, 1988 [GB] United Kingdom ............... 8812403

[51] Int. Cl.$^5$ .................. F16D 25/08; F16D 43/20
[52] U.S. Cl. ................... 192/56 F; 192/85 CA
[58] Field of Search ............. 192/56 F, 56 R, 54, 192/85 CA

[56] References Cited

U.S. PATENT DOCUMENTS

| | | | |
|---|---|---|---|
| 2,927,672 | 3/1960 | Banner | 192/56 F |
| 2,963,134 | 12/1960 | Banner | 192/56 F |
| 3,292,754 | 12/1966 | Peterson | 192/56 R |
| 3,298,488 | 1/1967 | McDonald | 192/56 F |
| 3,511,349 | 5/1970 | Herscovici | 192/56 F |
| 3,664,474 | 5/1972 | Blake et al. | 192/56 F |
| 3,722,644 | 3/1973 | Steinhagen | 192/56 R |
| 3,774,738 | 11/1973 | Steinhagen | 192/56 R |
| 4,007,818 | 2/1977 | Orwin | 192/56 R |
| 4,081,063 | 3/1978 | Malmros et al. | 192/56 F |
| 4,142,616 | 3/1979 | Dekoninck | 192/56 R |
| 4,263,996 | 4/1981 | Putney | 192/56 R |
| 4,541,512 | 9/1985 | Beasant et al. | 192/56 R |
| 4,770,281 | 9/1988 | Hanks | 192/56 F |

FOREIGN PATENT DOCUMENTS

| | | |
|---|---|---|
| 521399 | 3/1931 | Fed. Rep. of Germany .... 192/56 F |
| 2809174 | 9/1979 | Fed. Rep. of Germany . |
| 3232182A1 | 8/1984 | Fed. Rep. of Germany . |
| 2344747 | 10/1977 | France . |
| 2555269 | 5/1985 | France . |
| 889495 | 2/1962 | United Kingdom . |
| 979487 | 1/1965 | United Kingdom . |
| 1049525 | 11/1966 | United Kingdom . |
| 1100141 | 1/1968 | United Kingdom . |
| 1160062 | 7/1969 | United Kingdom . |
| 1370011 | 10/1974 | United Kingdom . |
| 1394920 | 5/1975 | United Kingdom . |
| 2080449A | 2/1982 | United Kingdom . |
| 1548751 | 7/1989 | United Kingdom . |

Primary Examiner—Rodney H. Bonck
Attorney, Agent, or Firm—Klarquist, Sparkman, Campbell, Leigh & Whinston

[57] ABSTRACT

A torque limiting clutch in which relatively rotatable and axially movable drive members are interconnected by balls and are axially biased together into torque transmitting engagement by air pressure which is released when the drive members move axially apart on disengagement when torque exceeds a predetermined value and in which the balls are guided by a cage so as to be maintained out of engagement with one drive member after disengagement. The cage is thinner than the radius of the balls and springs act on the cage and one drive member to maintain the balls out of engagement with the one drive member.

19 Claims, 6 Drawing Sheets

FLUID PRESSURE CLUTCH

RELATED U.S. APPLICATION DATA

Continuation-in-part of Ser. No. 209,963, June 22nd, 1988, which is a continuation-in-part of Ser. No. 106,629, Oct. 8th, 1987, both now abandoned.

BACKGROUND OF THE INVENTION

Field of the Invention

Summary of the Invention

An object of the invention is to provide a new and improved clutch.

According to the present invention we provide a clutch comprising a pair of relatively rotatable and axially movable drive members, each having torque transmitting abutments, a biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments when a relieving means relieves the biasing means and wherein the torque transmitting elements are guided by a cage which is free to rotate relative to both drive members during disengagement.

The clutch may be a torque limiting clutch and said movement of the torque transmitting elements out of torque transmitting relationship may occur when the torque exceeds a predetermined value and as a result of movement of the drive members axially apart, the relieving means relieving the biasing means when the torque exceeds the predetermined value.

When the torque to be transmitted exceeds the predetermined value the torque transmitting elements commence to roll out of the torque transmitting abutments and thus cause the drive members to be moved axially apart, the relieving means then operates to relieve the biasing means so that the drive members are spaced apart.

The cage may maintain the torque transmitting elements out of engagement with the torque transmitting abutments of one drive member.

Preferably the cage maintains the torque transmitting elements adjacent the other drive member.

The other drive member may be provided with torque transmitting element receiving means within which the torque transmitting elements are received when the clutch is disengaged and the torque transmitting elements being maintained within the receiving means by the cage.

The receiving means may be provided by the torque transmitting abutments of the other drive member.

The one drive member may be axially stationary relative to a body part of the clutch and the other drive member axially movable relative to the body part under the influence of the biasing means.

Alternatively, the one drive member may be axially movable relative to a body part of the clutch under the influence of the biasing means and the other drive member may be axially stationary relative to the body part.

Means may be provided to limit movement of the cage in a direction away from the other drive member.

The cage may be biased towards the other drive member by a cage biasing means.

Further alternatively, the cage may be biased towards the other drive member by a cage biasing means and, in addition, means may be provided to limit movement of the cage in a direction away from the other drive member.

Said means to limit movement of the cage may comprise abutment means to abut an inner annular surface portion of the cage or to engage an outer annular surface portion of the cage.

The cage biasing means may comprise spring biasing means such as a plurality of coil compression springs disposed angularly around the axis of rotation of the clutch, and may act between the one drive member and the cage.

Antifriction bearing means may be provided between at least one of the cage, cage biasing means and the one drive member.

The bearing means may be provided between the cage and the cage biasing means.

The bearing means may comprise a sliding bearing comprising a generally annular track provided on the cage and a bearing member engaged by the biasing means.

One bearing surface may be provided by a PTFE surface and the other by a steel or other suitable bearing material.

The cage biasing means may act between the cage and a member axially fixed and rotatable relative to the one drive member and may be disposed radially inwardly of the one drive member.

The one drive member may be rotatably and non-axially moveably mounted relative to a hub member, the other drive member being non-rotatably and axially moveably mounted relative to said hub member and the biasing means being static and the hub member being rotatable relative to the biasing means.

The other clutch member may be rotatably and non-axially moveably mounted relative to a hub member, the one drive member being non-rotatably and axially moveably mounted relative to said hub member and the biasing means being static and the hub member being rotatable relative to the biasing means.

The cage biasing means may act between the hub member, or an element fixed relative thereto, and the cage.

The cage biasing means may act between the inner member of a bearing carried on the hub member and the outer member of which rotatably mounts the one drive member on the hub member.

The cage may be provided with apertures within which the torque transmitting elements are received and be of a thickness to permit of the torque transmitting elements projecting from opposite sides of the cage for engagement with the torque transmitting abutments of the drive members.

The cage may be provided with means to retain the torque transmitting elements from movement through the apertures in a direction away from the other drive member.

Said means may comprise a generally frusto-conical configuration of each aperture.

The cage may be thinner than the radius of the torque transmitting element. This is particularly so when the torque transmitting abutments have a relatively steep abutment surface. For example, a surface inclined at about 55° or more to a plane normal to the axis of rotation of the clutch.

The cage may be movable axially relative to each drive member so that on disengagement of the clutch when the torque transmitting elements roll out of engagement with the abutments and move the drive members apart the cage is moved away from the other drive member.

The cage biasing means may serve to bias the one drive member away from the other drive member when the clutch is disengaged.

The cage biasing means may comprise an element which has a cage abutment means and an other drive member abutment means spaced so that the other drive member abutment means can abut the other drive member when the clutch is disengaged and the torque transmitting elements are receiving within torque transmitting element receiving means with which the other drive member is provided.

Alternatively, further biasing means may be provided to bias the one and other drive members apart.

The further biasing means may act between the one drive member and a part prevented at least from movement relative to the other drive member in a direction away from the one drive member.

The further biasing means may comprise spring biasing means such as a plurality of coil compression springs disposed angularly around the axis of rotation of the clutch.

The cage or further biasing means may comprise a ring member concentrically disposed relative to the cage.

The ring member may be constrained from rotation relative to the hub by at least one guide element non-rotatably associated with the hub and permitting of axial movement of the ring member relative to the hub.

The ring member may be constrained from rotation relative to the hub by an annular member fixed relative to the hub and a plurality of pins extending between the annular member and the ring member, the pins being non-rotatably connected to the annular and ring members and being slidable relative to at least one member thereof.

A coil compression spring may be disposed around at least one of said pins to bias the ring and annular members apart.

The biasing means may comprise a fluid pressure biasing means such as a pneumatic biasing means.

Movement of the one drive member away from the other drive member may cause operation of the relieving means.

The relieving means may operate to release the fluid pressure.

The torque transmitting abutments may be disposed equally radially and angularly relative to the axis of rotation of the drive members.

In this case each torque transmitting element may be received in a circumferentially adjacent torque transmitting abutment to the torque transmitting abutment with which it was engaged prior to disengagement.

Alternatively, the torque transmitting abutment may be disposed at different radii and/or angular positions relative to the axis of rotation of the drive members.

In this case each torque transmitting element may be received only in the torque transmitting abutment with which it was engaged prior to disengagement.

Guide means may be provided to constrain radial movement of the cage and the guide means may comprise an outwardly facing surface portion to engage an inner circumferentially extending surface portion of the cage or an inwardly facing surface portion to engage an outer circumferentially extending surface portion of the cage.

A first of said drive members may be rotatably and non-axially moveably mounted relative to a hub member, the second of said drive members being non-rotatably and axially moveably mounted relative to said hub member, the biasing means being static and the hub member being rotatable relative to the biasing means and to a static member, the static member having said first drive member rotatably mounted thereon.

The relieving means may comprise a valve means operable to relieve fluid pressure as a result of relative movement of the drive members on disengagement of the clutch.

The biasing means may comprise at least one piston moveable in a cylinder and the valve means comprise a valve member co-operating with a valve seat and the valve member being engaged by a piston to move the valve member out of sealing engagement with the valve seat to relieve the fluid pressure.

Means may be provided to interrupt the supply of fluid pressure to the biasing means and disengagement of the clutch.

According to another aspect of the present invention we provide a clutch comprising a pair of relatively rotatable drive members, each having torque transmitting abutments, disengagably connected in torque transmitting relationship by a plurality of rotatable torque transmitting elements, there being a plurality of circumferentially disposed, fluid operated, biasing means to bias said elements into torque transmitting relationship with said members when the clutch is engaged and to permit of disengagement of the torque transmitting elements when a relieving means relieves the bias.

The clutch may be a torque limiting clutch and said movement of the transmitting elements out of torque transmitting relationship may occur when the torque exceeds a predetermined value and the relieving means may relieve the biasing pressure when the torque exceeds the predetermined value.

A clutch according to the second aspect of the invention may incorporate the first aspect of the invention or any of the preferred features mentioned in connection with the first aspect of the invention which are applicable to a clutch according to the second aspect of the invention.

BRIEF DESCRIPTION OF THE DRAWINGS

The invention will now be described by way of example with reference to the accompanying drawings wherein.

DETAILED DESCRIPTION OF THE PREFERRED EMBODIMENTS

Figure 1:
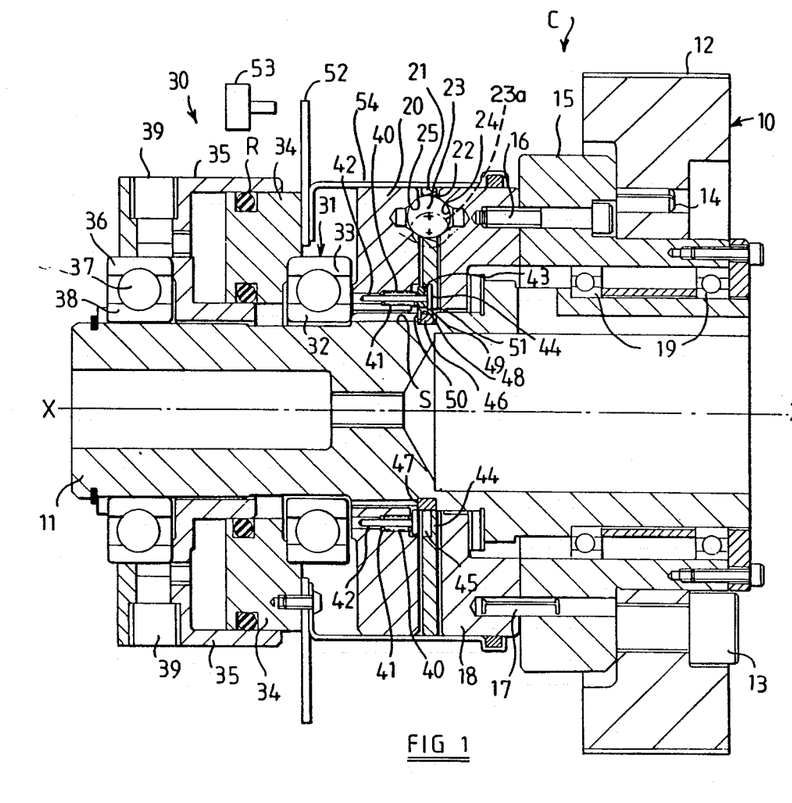
FIG. 1 is a longitudinal cross-sectional view through a torque limiting clutch embodying the invention.

Referring to FIG. 1, there is illustrated a torque limiting clutch C comprising drive members 10, 11. In this example the member 10 will be described as a driving member and the member 11 as a driven member but it should be understood that if desired the member 11 may be the driving member and the member 10 would then be the driven member.

The driving member 10 comprises in this example a drive gear 12 driven by a pinion from a prime mover (not shown) in a conventional manner. The driving member 10 may, alternatively, be driven in any desired manner. The gear 12 is fastened by set screws 13 and roll pins 14 to a body 15 which is connected by bolts 16 and roll pins 17 to a driving plate 18 of the clutch. Rotatably mounted within the body 15 by means of a pair of ball bearings 19 is the driven member 11 which can be connected to an apparatus to be driven in any desired manner.

The driven member 11 has a driven clutch plate 20 splined thereto as shown at S for axial sliding and non-rotatable movement relative to the driven member 11. Interposed between the driving and driven clutch plates 18, 20 is a cage plate 21 which has a plurality of apertures 22 for torque transmitting elements in the form of balls 23. The apertures 22 are of frusto-conical configuration having their smaller diameter end adjacent the driven clutch plate 20 and their larger diameter end adjacent the driving clutch plate 18.

The thickness of the cage plate 21 relative to the diameter of the balls 23 is such that the smaller diameter end of the frusto-conical aperture 22 engages the balls 23 as shown when the clutch is engaged i.e. on a chord approximately mid-way between the centre of the ball and its surface. The driving and driven clutch plates 18, 20 are provided with torque transmitting abutments 24, 25 respectively which are in the form of generally frusto-conical recesses having an included angle of approximately 70°. If desired other angles may be used, for example 90°, but a smaller angle such as 70° is preferred because this permits of transmittal of a greater torque between the clutch plates for a given force biasing the plates together by a resilient fluid pressure biasing means 30.

If desired the abutment may be of other shape such as generally prism shaped and again the abutment surfaces would be similarly inclined. That is the included angle could be 70° or 90° and hence would be inclined at 55° or 45° respective to a plane normal to the axis of rotation X—X of the clutch C.

The resilient fluid pressure biasing means 30, in the present example, comprises a ball bearing 31 the inner race 32 of which is engaged by the driven clutch plate 20 and the outer race 33 of which is engaged by a plurality of pistons 34 slidable in a corresponding plurality of cylinders 35 which are carried on the outer race 36 of a second ball bearing 37 the inner race 38 of which is engaged with the driven clutch member 11. An O ring seal R is provided between each piston 34 and its associated cylinder 35. In the present example four pistons 34 and associated cylinders 35 are provided circumferentially spaced around the clutch at the equi-angular positions. A different number of pistons may be provided, for example, eight. If desired, if a user wishes the clutch to transmit a very low torque then one or more of the piston and cylinder arrangements may be blanked off. Alternatively, if desired, instead of a plurality of circumferentially spaced piston and cylinder arrangements a single annular piston and cylinder arrangement may be provided.

Air if fed from a source of air under pressure via a passageway 39 to each cylinder 35 so that when air is applied under pressure to the interior of the cylinder 35 the associated pistons 34 are biased to the right in the figure to bias the driven clutch plate 20 towards the driving clutch plate 18 and thus to force the balls 23 into torque transmitting relationship with the abutments 24, 25 on the plates 18, 20 respectively. If desired any other form of relievable resilient biasing means may be provided.

A combined cage and drive member biasing means comprises a plurality of coil compression springs 40 provided at equi-angularly disposed positions around the axis X—X in stepped passages 41 provided in the driven clutch plate 20. A plurality of pins 42 are received within the passages 41 and are surrounded by the coil compression springs 40. The pins 42 project from an annular steel pressure ring or washer 43 and the coil compression springs 40 are engaged between the washer 43 and the step in the passages 41 so that the washer 43 is biased, in FIG. 1, to the right against a PTFE washer 44 provided in a recess 45 of annular configuration in the cage plate 21.

A split ring 46 is located in a groove 47 of the driven member 11 and provides an outwardly facing surface part 48 for engagement with an inwardly facing surface part 49 of the cage so as to restrain the cage from movement radial to the axis X—X when the clutch is disengaged as hereinafter described. The split ring 46 is retained in the groove 47 by a circlip or the like 50 which can abut an annular portion 51 of the cage plate 21 over which the PTFE washer may extend if desired and as shown.

In use, when the driving member 10 is rotated then so long as the torque to be transmitted to the driven clutch member 11 is lower than a predetermined torque, torque is transmitted between the clutch members by the balls 23 and torque transmitting abutments 24, 25. When the torque to be transmitted reaches a predetermined torque the balls 23 begin to roll out of the associated abutments 24, 25 when the force applied by the pistons 34 is less than the resultant force tending to bias the driven plate 20 to the left in the Figure.

As the driven plate 20 moves away from the driving plate 18 the piston 34 is pushed to the left in the figure and this causes a relieving means actuating disc 52 to engage a sensor of a relieving means operating means 53 such as a micro-switch to open a electrically operated valve in the supply of air to the passages 39 so that the air supply is cut off and the pressure within the cylinders 35 released thereby relieving the resilient bias of the driven plate 20 to the right in FIG. 1.

In addition, as the balls 23 ride out of their associated abutments 24, 25 they rotate and cause the cage plate 21 to rotate at half the relative speed between the driving and driven clutch plates, relative to each clutch plate. Because of the above described frusto-conical configuration of the apertures 22 and their relationship with the size of balls 23 the cage plate 21 is also moved to the left in the figure away from the driving clutch plate 18.

When the pressure in the cylinders 35 is relieved as described hereinbefore the coil springs 40 bias the driven clutch plate 20 to the left in the figure until the biasing force of the springs 40 is reduced to an extent that it cannot overcome the friction in the splined connection S and seals R.

As the driving and driven members continue to rotate relative to one another the balls 23 continue to rotate until they become circumferentially aligned with the next adjacent torque transmitting abutments 24, 25 in the driving and driven clutch plates. When the balls are thus aligned the springs 40 urge the cage plate 21 to the right which movement is permitted by the alignment of the balls 23 with the torque transmitting abutments 24 in the driving clutch plate 18 and thus the cage plate guides the balls 23 into the abutments and maintains the balls therein whilst the driving clutch plate 18 continues to rotate relative to the driven clutch plate 20. The cage plate 21 thus maintains the balls 23 out of position for engagement with the abutments 25 of the driven clutch plate 20 so that relative rotation between the driving and driven clutch plates can continue without any risk of the balls chattering as a result of engagement with the abutments 25. The PTFE ring 44 running against the steel ring 43 has been found to provide a satisfactory bearing because the spring force required to be applied by the springs 40 is relatively light. If desired, however, any other suitable bearing means may be provided such a sliding bearing comprising other suitable materials or a rolling bearing such as a needle race.

It may be that in operation depending upon the particular circumstances, such as the speed of rotation of the clutch and the torque to be transmitted, the balls 23 do not enter the next adjacent torque transmitting abutments as described above. For example, particularly at high speeds of revolution the inertia may be such that the balls 23 bounce over one or more of the sequentially adjacent torque transmitting abutments 24 before the cage plate 21 can maintain the balls 23 in engagement with the torque transmitting abutments 24. In practice this will occur only in a small number of applications and is of no consequence since no significant damage will be done by this limited amount of bouncing. Conversely, in some circumstances the balls 23 may slip during disengagement of the clutch so that the cage plate 21 does not rotate sufficiently relative to the driving plate 18 for the balls 23 to be initially aligned with the torque transmitting abutments 24. In this case friction will cause the cage subsequently to rotate and bring the balls 23 into alignment with the abutments 24.

In certain circumstances and where the separation between the driving and driven plates is sufficiently great the balls 23 may be maintained out of engagement with the recesses of one clutch plate even though they are not received in any receiving means of the other clutch plate.

Particularly at high speeds of revolution the driven clutch plate 20 and the cage plate 21 may be moved away from the driving clutch plate 18 at relatively high speed that the resulting momentum may cause the cage plate 21 to be positioned sufficiently closely adjacent the driven plate 20 for the balls 23 to at least partially enter the torque transmitting abutments 25 thereof before the coil springs 40 of the cage biasing means can move the cage plate 21 away from the driven clutch plate 20. Accordingly, it is preferred to provide a means to limit movement of the cage in a direction away from the driving plate 18 and in the present embodiment this is provided by the circlip 50 which abuts the annular portion 51 of the cage plate 21 to limit movement of the cage plate 21 to the left in FIG. 1 whilst the driven plate 20 can continue to move to the left. If desired, this means to limit movement of the cage in a direction away from one drive member may be omitted where the circumstances of services permit of this, for example, when the clutch is used at a relative low speed of rotation.

If desired any other form of cage fluid pressure biasing means to bias the cage plate towards the driving plate 18 and which reacts against the driven clutch plate 20 may be provided.

Where, as in the present example and as is preferred, the torque transmitting recesses 24, 25 have an included angle of 70° the space available between the clutch plates 18, 20 for the drive plate is relatively small and hence the thickness of the cage plate is less than half the ball diameter. It is for this reason that the cage plate is arranged to be movable axially with the balls as they move out of the recesses in the driving clutch member.

The predetermined torque at which the clutch disengages can be easily adjusted by varying the pressure of the air acting on the pistons 34. The air pressure and hence the torque level can be easily adjusted whilst the clutch is running it being appreciated that, of course, the cylinders 35, pistons 34, disc 50 and a dust shield 54 are stationary at all times and thus there is no problem in feeding air to the passages 39 operating the relieving means.

The relieving means may be arranged to relieve the fluid pressure biasing means when the driven clutch plate 20 has moved through a axial distance somewhat less than that required to completely disengage the balls 23 from the recesses 24 and 25 but complete disengagement is achieved by the hereinbefore described springs 40 when the biasing means is relieved.

The number of torque transmitting balls and abutments are chosen according to the torque to be transmitted and, for example, may comprise six balls and associated pairs of recesses.

The means for relieving the biasing means may comprise a suitable means for example any suitable means sensitive to movement of any convenient part which moves with the driven clutch plate 20.

In a modification the torque transmitting elements 23 and associated torque transmitting abutments 24, 25 are disposed at different radii and/or angular positions relative to the axis of rotation X—X of the clutch. For example, at least one ball 23 and its associated torque transmitting abutments may be disposed as shown at 23a in dotted line in FIG. 1 whilst at least one other ball 23 and its associated torque transmitting abutments is disposed as shown in full line in FIG. 1. This ensures that the clutch can only be engaged when the drive members are in a unique angular relationship.

In such a arrangement the driving and driven clutch members 10, 11 must rotate through two revolutions relative to each other to rotate the cage through one complete revolution so that the balls 23 are in position to occupy, receiving means provided by the same recesses 24, 25 they occupied prior to disengagement. This increases the time interval between the start of disengagement and the positioning of the balls 23 in position for entering the receiving means compared with the time interval which obtains in the first described embodiment where it is necessary only for the clutch parts to rotate sufficiently to move the balls into position for engagement in the next adjacent torque transmitting abutments to those occupied prior to disengagement. Thus, a longer period is provided for the relieving means to relieve the air pressure which is particularly advantagous at high speeds of revolution. This modification can be applied to all the other embodiments described hereinafter.

Referring now to FIGS. 2 to 10 these illustrate nine further different embodiments which are the same as the embodiments described hereinbefore with reference to FIG. 1 except for the features shown differently in the drawings and hereinafter to be described. The same reference numerals have been used in FIGS. 2 to 10 as were used in FIG. 1 to refer to corresponding parts.

Figure 2:
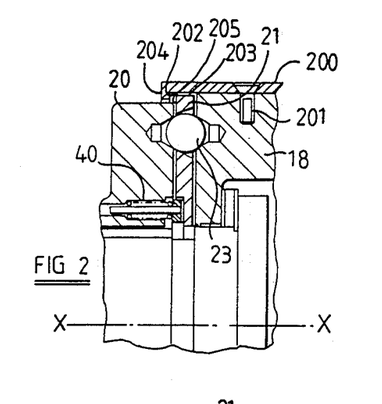
FIGS. 2 to 8 are, respectively, part longitudinal cross-sectional views through seven different alternative embodiments of the invention.

In the embodiment shown in FIG. 2 the split ring 46 and circlip 50 are omitted and instead the cage plate 21 is constrained from radial movement relative to the axis X—X by means of a cylindrical sleeve 200 fixed by screws 201 to the driving clutch plate 18. The sleeve 200 provides an inwardly facing circumferentially extending surface part 202 for engagement with an outwardly facing circumferentially extending part 203 of the cage 21. The sleeve 200 has an inturned flange 204 for engagement with an annular surface part 205 of the cage 21 and has the same effect as the circlip 50 described hereinbefore. In all other respects the embodiment illustrated in FIG. 2 is as previously described.

Figure 3:
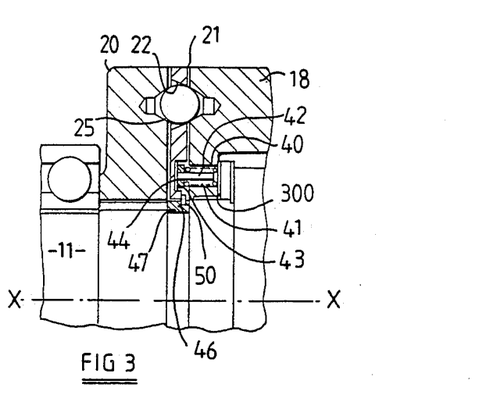

Referring now to FIG. 3, in this embodiment a combined cage and driver member biasing means is provided by springs 40, passage 41, which in the present example is not stepped but closed by a suitable closure member 300, pins 42, steel washer 43 and PTFE washer 44. The cage biasing means acts between the driving clutch plate 18 and the cage plate 21. In addition, the frusto-conical aperture 22 is orientated in the reverse direction so that the smaller diameter end thereof is adjacent the driving clutch plate 18. A split ring 46 is again provided and is located in a groove 47 in the driven clutch member 11 by a circlip or the like 50 but which in this example is provided on the side of the clutch plate 21 adjacent the driving clutch plate 18. In use, the clutch operates essentially as described hereinbefore in connection with FIG. 1 except that the cage biasing means 40-44 serves to bias the cage towards the driven clutch plate 20 so that the balls 23 are maintained in receiving means such as torque transmitting abutments 25 provided in the driven clutch plate 20 and the driven clutch plate 20 and cage plate 21, when the clutch has fully disengaged, rotate together relative to the driving clutch plate 18. The cage biasing means 40-44, in this embodiment, not only bias the cage plate 21 away from the driving clutch plate 18 but also bias the driven clutch plate 20 away from the driving clutch plate 18 through the intermediary of the cage plate 21 and apertures 22 and balls 23 and thus also provides the drive member biasing means.

Figure 4:
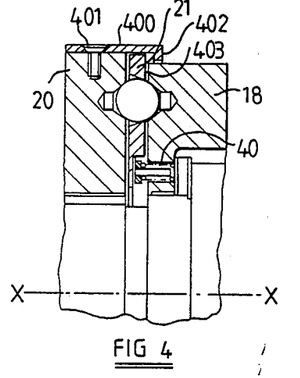

Referring now to FIG. 4. This embodiment is essentially similar to that described with reference to FIG. 3 but radial location of the cage plate 21 is provided by a cylindrical sleeve 400 fastened by screws 401 to the driven clutch plate 20. The sleeve 400 has an inturned flange 402 which is engagable with an annular surface part 403 of the cage plate 21. The split ring 43 and circlip 50 of the FIG. 3 embodiment are omitted. This embodiment operates in the same way as described hereinbefore with reference to FIG. 3 except that there is a positive limit to movement of the cage plate 21 away from the driven clutch plate 20 by virtue of the flange 402. Thus, if, as a result of momentum and inertia on disengagement, particularly at high speeds, there is any tendency for the clutch plate 21 to move away from the driven clutch plate 20 and remain adjacent the driving clutch plate 18 then the engagement between the flange 402 and annular surface part 403 will provide a positive limit to such separation of the cage plate 21 from the driven plate 20.

Figure 5:
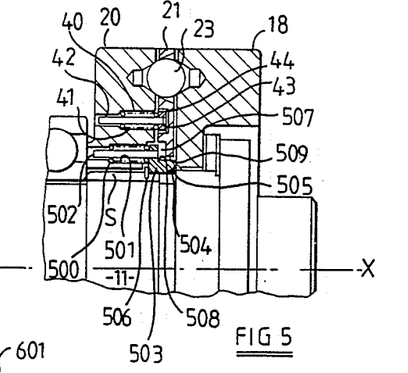

Referring now to FIG. 5. In this embodiment a cage biasing means comprising the components 40-44 described hereinbefore is provided in a similar manner to the embodiment described with reference to FIG. 1 except that these components are provided at a position which is radially outwardly of the position at which they are provided in FIG. 1. Inwardly of the cage biasing means is provided a further biasing means comprising a plurality of coil compression springs 500 provided at equi-angular positions around the axis X—X in stepped passages 501 provided in the driven clutch plate 20. A plurality of pins 502 are received within the passages 501 and are surrounded by the coil compresion springs 500. The pins 502 project from an annular steel ring 503 and the coil compression springs are engaged between the ring 503 and the step in the passages 501 so that the clutch plate 20 is biased, in FIG. 5, to the left away from the driving clutch plate 18. The ring 503 is mounted on the outer edges of the splines S of the driven clutch member 11 and has an annular end surface 504 which abuts an annular surface part 505 of the driving clutch plate 18. The ring 503 is prevented from movement away from the driving clutch plate 18 by a circlip 506. The ring 503 and clutch plate 21 have mutually co-operating rebates which provide a space 507 to permit of movement of the clutch plate 21 away from the driving clutch plate 18 during disengagement of the clutch.

In this embodiment instead of relying on the cage biasing means 40-44 both to bias the cage 21 towards the driving clutch plate 18 and to bias the driven clutch plate 20 away from the driving clutch plate 18 the further biasing means 500-507 provides a separate drive member biasing means to supplement the bias of the driven clutch plate 20 away from the driving clutch plate 18. The springs 40 and 500 may be chosen of appropriate strength for their purpose.

The rebate in the ring 503 provides an outwardly facing circumferential surface 508 which cooperates with an inwardly facing circumferential surface part 509 of the cage plate 21 to guide the cage plate 21 radially relative to the axis X—X of the clutch.

Figure 6:
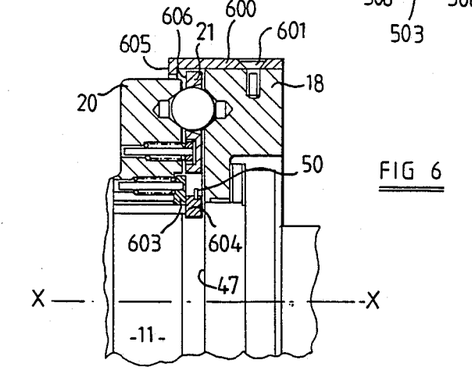

Referring now to FIG. 6. This illustrates a modification of the embodiment described with reference to FIG. 5. In this modification radial location of the clutch plate 21 is provided by a cylindrical sleeve 600 secured by screws 601 to the driving clutch plate 18. The inner periphery of the clutch plate 21 does not engage any locating member and the ring 503 described hereinbefore is formed in two separate parts namely, a part marked 603 in FIG. 6 and a separate member in the form of a split ring 604 secured in a groove 47 in the driven clutch member 11 by a circlip 50.

The sleeve 600 has an inturned flange 605 which engages an annular surface part 606 which limits movement of the clutch plate 21 away from the driving clutch plate 18 in a manner similar to that described hereinbefore in connection with FIG. 2.

Figure 7:
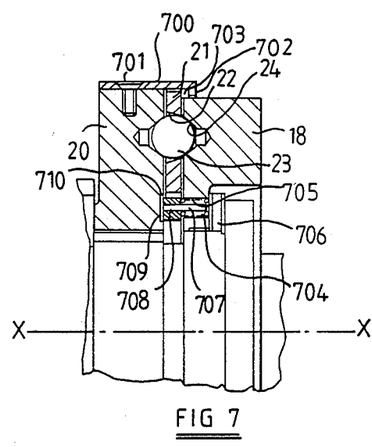

Referring now to FIG. 7. In this embodiment there is no separate cage biasing means but instead a cage limiting means comprising a sleeve 700 secured by screws 701 to the driven clutch plate 20 and having an inturned flange 702 for engagement with an annular surface part 703 of the cage plate 21. In this embodiment the frustoconical apertures 22 in the cage plate 21 have their smaller diameter ends adjacent the driving clutch plate 18.

A drive member biasing means is provided between the driving clutch plate 18 and the driven clutch plate 20 and comprises a plurality of coil compression springs 704 disposed equi-angularly about the axis X—X of the clutch in passages 705 which are closed by a closure member 706. A plurality of pins 707 are received within the passages 705 and are surrounded by the springs 704. The pins 707 project from an annular steel pressure ring or washer 708 and the coil compression springs 704 are engaged between the washer 708 and the closure member 706 so that the washer 708 is biased, in FIG. 7, to the left against a PTFE washer 709 provided in a recess 710 of annular configuration in the driving clutch plate 20.

In use, on disengagement of the clutch, the further drive member biasing means 704–710 acts as a combined drive member biasing means and a cage biasing means and biases the driven clutch plate 20 away from the driving clutch plate 18 to ensure that the balls 23 are maintained out of engagement with the torque transmitting recesses 24 in the driving clutch plate 18 as a result of the clutch plate 21 being moved to the left by the flange 702 as a result of movement of the driven clutch plate 20 to the left both by the act of disengaging the clutch and the effect of the further biasing means 704–1710.

Figure 8:
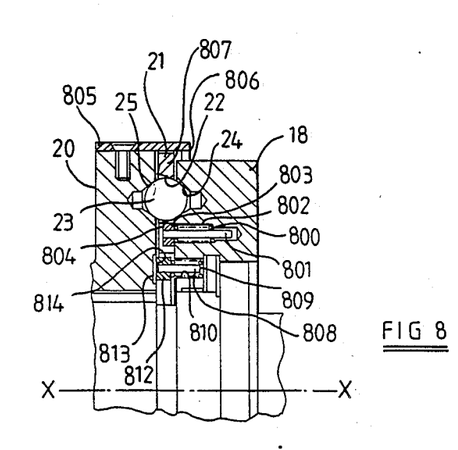

Referring now to FIG. 8 there is provided a cage biasing means comprising coil compression springs 800 and pins 801 received in a stepped bore 802 and acting to urge a washer or pressure ring 803 against PTFE washer 804 essentially disposed as described in connection with previous embodiments. The cage plate 21 is arranged with the smaller diameter end of the frustoconical apertures 22 adjacent the driving clutch plate 18 and the driven clutch plate 20 has a sleeve 805 which guides the cage plate 21 radially and has an inturned flange 806 for engagement with an annular surface part 807 of the cage plate 21. In addition, a further biasing means, which provides a separate drive member biasing means, is provided comprising a plurality of coil compression springs 808 and pins 809 engaged in bores 810 closed by closure member 811 and which serve to urge a washer or pressure ring 812 against a PTFE washer 813 received in a rebate 814 in the driven clutch plate 20, all as described hereinbefore in connection with FIG. 7. In this embodiment the cage biasing means 800–804 resiliently biases the cage 21 towards the driven clutch plate 20 to maintain the balls 23 within receiving means such as provided by torque transmitting abutments 25 in the driven clutch plate 20. The flange 806 provides a positive limit to movement of cage 21 away from the driven clutch plate 20 which is particularly suitable when the clutch is used in an application where it rotates at high speed to avoid any risk of the cage plate 21 moving adjacent the driving clutch plate 18 so that the balls 23 can engage the abutments 24 thereof before the cage biasing means 800–804 can move the cage plate 21 away from the driving clutch plate 18. If desired, in a modification, the flange 806 may be omitted.

Figure 9:
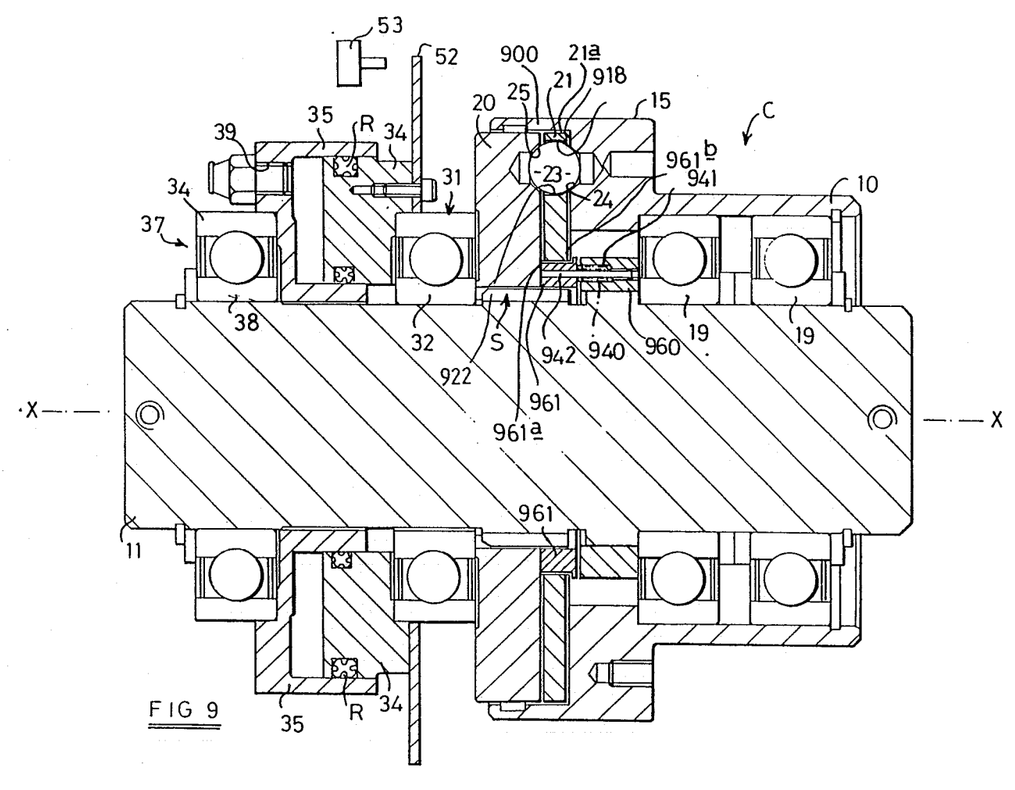
FIG. 9 is a longitudinal cross-sectional view through an eighth alternative embodiment of the invention.

Referring now to FIG. 9, the driving member 10 is as described in connection with FIG. 1, except that the drive gear 12 and the methods of attachment, which are the same as in FIG. 1, are not illustrated.

The body 15 in the present example is machined so as to have formed integral therewith a part 918 corresponding to the driving plate 18. The cage plate 21 has apertures 922 which are generally cylindrical but have a smaller diameter end portion adjacent to the driving clutch plate 918. As in the case of previous embodiments the thickness of the cage plate 21 relative to the diameter of the balls 23 is such that the smaller diameter end of the aperture 922 engage the balls 23 as shown when the clutch is engaged, i.e. on a chord approximately mid-way between the centre of the ball and its surface.

The main difference compared with the previously described embodiments, lies in the cage and drive member biasing means which, in the present example, avoids sliding between the parts of the biasing means when the clutch is running free after the clutch is disengaged.

To this end the cage and drive member biasing means comprises coil compression springs 940 provided, at equally angularly disposed positions around the axis X—X, in stepped passages 941 provided in an annular member 960 fixed relative to the driven member 11. The springs are guided by pins 942 which are disposed within the passages 941 so that their right-hand ends, in FIG. 9, are slidable within the smaller diameter part of the associated passage 941. At their other ends the pins 942 are fixed to a further annular ring member 961 which is rotatable and slidable relative to the cage plate 21. A clearance is provided between opposed cylindrical surfaces of the ring member 961 and the cage plate 21 so as to permit of free relative rotation and longitudinal sliding movement therebetween whilst an internal cylindrical surface of the ring member 961 is a clearance fit on the splines S so that the ring member 961 is guided for axial sliding movement by the splines S.

If desired, alternative guiding arrangements may be provided. For example, the cage plate 21 may be guided for rotation and sliding relative to the driven member 11 by a guide surface engageable with an external cylindrical surface 21a of the cage plate 21; for example, a guide surface provided on a sleeve 900 of the driving clutch plate 918 or by a similar surface associated with the driven clutch plate 20, in this case the clearance between the ring member 961 and the cage plate 21 may be such that it is the cage member which guides the ring member 961 for such movement whilst the clearance between the ring member and the splines is greater. Alternatively, a combination of the above arrangements may be provided so that both the splines S and the cage plate 21 share the guiding function. Further alternatively, the ring member 961 may be guided by the pins 942 alone or in combination with any of the previously described arrangements, or the ring member 961 may be guided by the pins 942 alone or together with the splines S and the clearance between the ring member 961 and the cage plate 21 being such that the cage plate is guided by the ring member for said rotation and sliding.

The ring member 961 has an end surface 961a and a shoulder 961b which are spaced apart by a distance greater than the thickness of a part of the cage plate 21 therebetween. The coil compression springs 940 are engaged between the further annular member 961 and a shoulder between the larger and smaller diameter parts of their associated passage 941.

In use, when the torque to be transmitted reaches a predetermined torque, the balls 23 begin to roll out of the associated abutments 24, 25 when the force supplied by the pistons 34 is less than the resultant force tending to bias the driven plate 20 to the left of FIG. 9. As the driven plate 20 moves away from the driving plate 18 the piston 34 is pushed to the left in FIG. 9 to operate the relieving means as described in connection with FIG. 1.

In addition, as the balls 23 ride out of their associated abutments 24, 25 they rotate and cause the cage plate 21 to rotate at half the relative speed between the driving and driven clutch plates, relative to each clutch plate. In addition, the springs 940 bias the cage plate 21 to the left in FIG. 9 so that it follows the axial movement of the balls 23.

As the driving and driven members continue to rotate relative to one another, the balls 23 continue to rotate until they become circumferentially aligned with the next adjacent torque transmitting abutments 24, 25 in the driving and driven clutch plates. When the balls are thus aligned, the springs 940 act initially as a cage biasing means and urge the cage plate 21 to the left, which movement is permitted by the alignment of the balls 23 with the torque transmitting abutments 25 in the driven clutch plate 20 and thus the cage plate 21 guides the balls 23 into the abutments and maintains the balls 23 therein, whilst the driving clutch plate 18 continues to rotate relative to the driven clutch plate 20. When the balls 23 are engaged in the next adjacent abutments 25, the end surface 961a of the ring 961 engages the driven clutch plate 20 and the springs 940 act as a drive member biasing means and the driven clutch plate 20 is thus biased to the left in FIG. 9 until the biasing force of the springs 940 is reduced to an extent that they cannot overcome the friction in the splined connection S and seals R. The shoulder 961b prevents movement of the cage plate 21 to the right away from the driven plate 20 and hence the balls 23 are maintained at least partially engaged within the abutments 25.

The cage plate 21 thus maintains the balls 23 out of position for engagement with the abutments 24 of the driving clutch plate 18 so that relative rotation between the driving and driven clutch plates can continue without any risk of the balls chattering as a result of engagement with the abutments 24. Because the springs 940 are fixed relative to the driven member 11, they, and the ring 961, are fixed relative to the driven clutch plate 20 and so there is no relative rotation at any time between any of the parts of the biasing means. In particular, there is no relative rotation between the driven clutch plate 20 and the surface 961b of the ring member 961 which acts thereon. There is, of course, relative rotation between the shoulder 961b and the cage plate 21 but this occurs only during disengagement and so the contact is for a very limited period of time and the extent of rotational movement is very limited, so that no special anti-friction bearing means is required between the shoulder 961b and the cage plate 21, although, of course, an anti-friction bearing means could be provided if desired.

The above described sequence of operations assumes that there is sufficient delay in the air pressure in the cylinders 35 being released for the above described relative rotation between the driving and driven clutch members to take place to align the balls 23 with the next adjacent torque transmitting abutments. Where relative rotation between the clutch parts takes place relatively slowly and/or the torque transmitting abutments are disposed so that the balls become aligned only after a complete revolution between the clutch parts, there may be insufficient time for the balls to become aligned with the next adjacent receiving means before the clutch pressure has fallen. In this case the springs 940 will have biased the clutch plate 21, by virtue of engagement of the shoulder 961b therewith to the left and hence have moved the driven clutch plate 20 to the left by virtue of engagement of the balls 23 therewith. When such movement occurs, the balls 23 will have been moved out of engagement with the driving clutch plate 918 and hence further relative rotation with the cage plate 21 and clutch plate 20 will not take place. In this case, the balls 23 will not be engaged with an abutment 25 but will still be maintained spaced out of engagement with the clutch plate 918 by virtue of the above described movement of the cage plate 21 and clutch plate 20 to the left.

Figures 9A, 11:
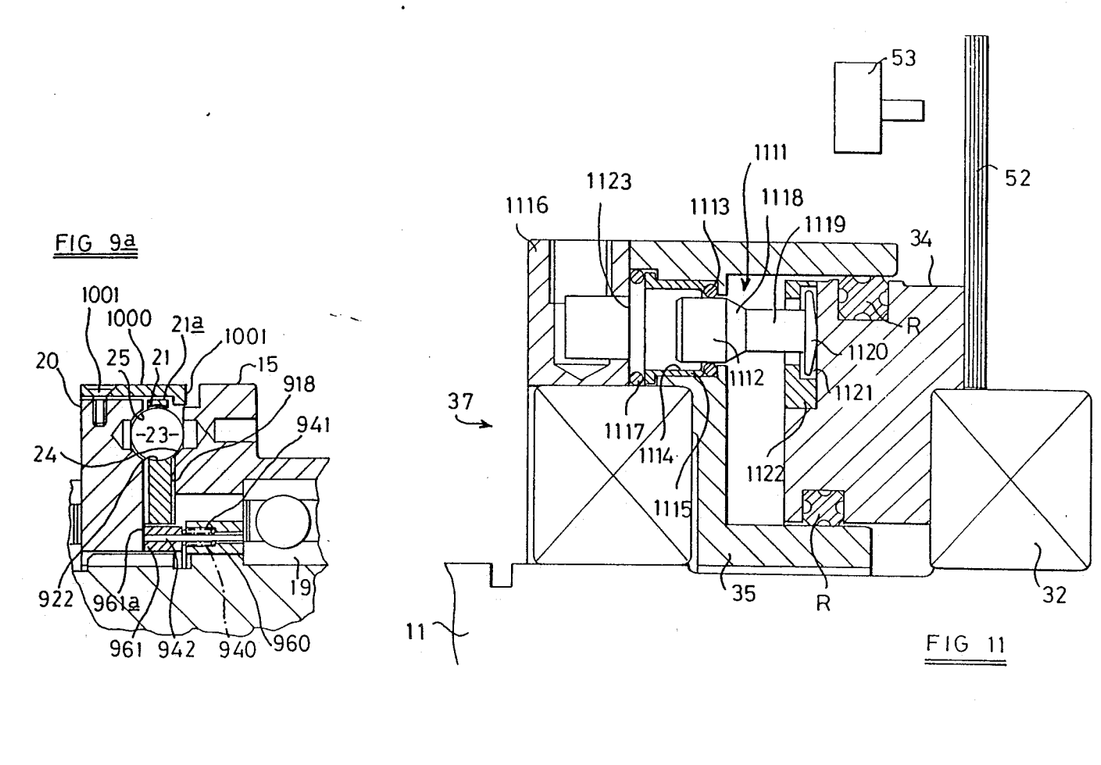
FIG. 9a is a fragmentary longitudinal cross-sectional view showing a modification of the embodiment of FIG. 9.
FIG. 11 is a part longitudinal cross-sectional view of a modification applicable to all the previously mentioned embodiments.

In a modification, shown in FIG. 9a, instead of providing the shoulder 961b to engage the cage plate 21, the cage plate is engageable by an inturned flange 1002 provided on a cylindrical sleeve 1000, fastened by screws 1001 to the driven clutch plate 20. In this case the ring 961 and associated biasing components such as the pin 942, springs 940 and annular member 960, provide a further biasing means rather than a cage biasing means and the cage is controlled by indirectly thereby under the control of the inturned-flange 1002.

Figure 10:
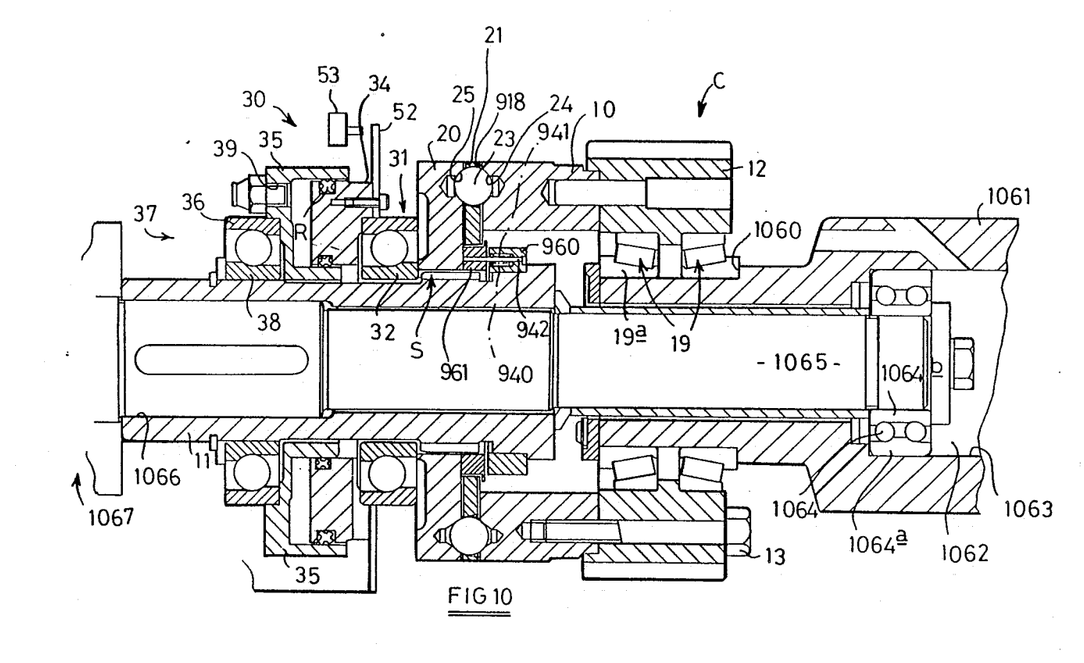
FIG. 10 is a longitudinal cross-sectional view through a ninth alternative embodiment of the invention.

Referring now to FIG. 10, there is shown a clutch which is essentially similar to the clutch described with reference to FIG. 9. In this embodiment the driving member 10 carries a gear 12 bolted thereto by set screws 13 and roll pins, not shown, in a similar manner to that described hereinbefore with reference to FIG. 1. In this embodiment it is the gear 12 which is connected to an apparatus to be driven by the clutch and the member 11 comprises a driving member.

The gear 12 houses bearings 19 which, in the present example, are taper roller bearings. The taper roller bearings 19 have inner races 19a which instead of being carried by the member 11 are carried in a recess 1060 provided on a massive and strong static member 1061. The static member 1061 has a stepped internal passage 1062 in the larger diameter part 1063 of which is received the outer race 1064a of a double ballbearing 1064, the inner race 1064b of which carries one end of extension part 1065 of the member 11. The member 11 has an internal passage 1066 in which is received the part 1065 which is connected, at the end 1067 thereof, to a motor which is to drive the clutch. This embodiment is particularly applicable to a printing press where the parts driven by the gear 12 may be desired to be maintained stationary for a long period of time. Indeed the clutch may be operated in such circumstances in a non-torque limiting manner in the sense that the air pressure to the chambers 35 may be deliberately relieved so as to disconnect the drive irrespective of any torque limiting situation.

By providing the bearing configuration described hereinbefore, and in particular by mounting the bearings 19 on the static member 1061, there is no risk of drive being transmitted through the clutch by virtue of the bearings 19 wholly or partially seizing up. Therefore, if maintenance is being carried out on a machine driven by the gear 12 then there is no risk of an operative being injured due to the apparatus starting to operate as a result of the bearings 19 seizing up, since the member 11 which continues to rotate is disposed within the massive static member 1061 and should the bearings 1064 seize up, then the loads would be accommodated by the massive static member 1061 and not be transmitted to the bearings 19 and hence not transmitted to the gear 12 and hence to the machinery to be driven. Of course, the same safety factor is provided if the drive part is reversed, that is to say, if the member connected to the part 1067 is static and the drive is applied through the gear 12.

Referring now to FIG. 11, there is shown a modification which is applicable to all the previously described embodiments. In the previously described embodiments the pressure of air in the cylinders 35 has been relieved by virtue of engagement of a relieving means operating means 53 operated by an actuating disc 52. In FIG. 11 the relieving means comprises, alternatively, a valve 1111 which is operative, as hereinafter to be described, to release the air pressure from within the cylinder 35 when the piston 34 has been moved to the left, in FIG. 11, as a result of disengagement of the balls 23 from their associated recesses 24, 25 as hereinbefore described.

The valve 1111 comprises a valve head 1112 in sealing engagement with an O-ring 1113 retained within a bore 1114 by a sleeve 1115 which is itself retained by an end cap 1116 through a further O-ring 1117.

The head 1112 is connected by a frusto-conical part 1118 to a stem 1119 having a flange 1120 which is received in a recess 1121 in a member 1122 fixed, for example, by screws, to the piston 34. As the piston 34 is moved to the left on disengagement of the clutch the frusto-conical part 1118 will move into alignment with the O-ring 1113 thereby providing a passage for air from the interior of the cylinder 35 to a passage 1123.

The passage 1123 is arranged to be of larger cross-sectional area than the passage, not shown, by which air is introduced into the chamber 35. Consequently, when the valve 1111 opens, air is exhausted more quickly than it can be introduced into the cylinder 35 so that the pressure is relieved.

If desired, a microswitch 53 may be provided, actuated by a disc 52 so as to interrupt the supply of air to the interior of the chamber 35. Alternatively, an impulse air valve may be provided, which is actuated by the flow of air through the passages 1123 to close a valve in the air supply to the chambers 35. In all cases, because the passages 1123 are of greater cross-sectional area than the corresponding inner passage to the associated cylinders 35, the pressure is relieved when the clutch disengages, thus there is no risk of the clutch re-engaging or attempting to re-engage if for some reason the microswitch 53 as described heretobefore fails to operate. For example, if the relative position of the microswitch 53 and disc 52 has been damaged during maintenance operations. In the above described arrangement where a microswitch corresponding to the microswitch 53 is provided to switch off the air, then should this not operate, because of damage or for any other reason, the consequence is simply one of waste of air, so the pressure would still be relieved because of the above mentioned difference in size between the air inlet and outlet passages.

Although the clutches described hereinbefore are primarily intended as torque limiting clutches, if desired they may be used as a simple clutch under the control of an operator or of automatic operating means, drive being transmitted when air under pressure is supplied to the cylinder 35 and drive being disconnected when the air supply thereto is relieved by appropriate mechanism in the air supply means.

The above described embodiments are not regarded as being exhaustive and other modifications are possible to provide appropriate means for controlling the cage plate so that the cage plate maintains the balls out of position for engagement with the torque transmitting abutments in one of the clutch members.

In all the previously described embodiments re-engagement is achieved simply by applying the air pressure to the pistons 34 so that the recesses 25 in the driven clutch plate 20 are moved into torque transmitting engagement with the balls 23 when they become suitably aligned therewith as a result of the relative rotation between the driving and driven clutch members since in these embodiments the balls 23 are already in engagement with the torque transmitting abutments in the driving clutch plate 18.

In a further modification, not shown, which can be applied to all the previously described embodiments; a receiving means separate from the torque transmitting elements may be provided, for example, by providing similarly shaped frusto-conical recesses in the driving plate 18 to the torque transmitting abutments therein but disposed angularly intermediate adjacent torque transmitting abutments. In this embodiment to reset the clutch it would be necessary to move the torque transmitting elements out of the receiving means and move them into position for engagement with drive transmitting abutments in the driving plate 18, for example, by rotating the cage plate relative to the driving plate 18 by suitable means and then reapplying the air pressure to the pistons 34 so that the torque transmitting abutments in the driven plate 20 would move into torque transmitting engagement with the balls 23 when they become angularly aligned therewith as a result of the relative rotation between the driving and driven clutch members.

We claim:

1. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, a relieving means to relieve the fluid pressure of said biasing means, a cage to guide the torque transmitting elements, means to mount the cage between said drive members for free rotation relative thereto during disengagement of the clutch,
  (a) means to maintain the cage spaced further from one of said drive members when the clutch is disengaged than when the clutch is engaged and
  (b) drive member biasing means to move the drive members apart when the clutch is disengaged to provide a separation between the parts of the drive members which are engagable by the torque transmitting elements which is greater than the diameter of the torque transmitting elements
to maintain the torque transmitting elements out of engagement with the torque transmitting abutments of said one drive member when the clutch is disengaged.

2. A clutch according to claim 1 wherein the clutch is a torque limiting clutch and said movement of the torque transmitting elements out of torque transmitting relationship occurs when the torque exceeds a predetermined value and is as a result of movement of the drive members axially apart by the torque transmitting elements and the relieving means relieves the biasing means when the torque exceeds the predetermined value.

3. A clutch as claimed in claim 1 wherein the cage maintains the torque transmitting elements adjacent the other drive member when the clutch is disengaged.

4. A clutch as claimed in claim 3 wherein the other drive member is provided with torque transmitting element receiving means within which the torque transmitting elements are received when the clutch is disengaged and the torque transmitting elements are maintained within the receiving means by the cage.

5. A clutch as claimed in claim 3 wherein means are provided to limit movement of the cage in a direction away from the other drive member.

6. A clutch as claimed in claim 3 wherein the cage is biased towards the other drive member by a cage biasing means when the clutch is disengaged.

7. A clutch as claimed in claim 6 wherein the cage biasing means acts between the one drive member and the cage.

8. A clutch as claimed in claim 6 wherein the cage biasing means acts between the cage and a member axially fixed and rotatable relative to the one drive member and disposed radially inwardly of the one drive member.

9. A clutch according to claim 1 wherein the cage is provided with apertures within which the torque transmitting elements are received and is of a thickness to permit the torque transmitting elements to project from opposite sides of the cage to engage the torque transmitting abutments of the drive members.

10. A clutch as claimed in claim 9 wherein the cage is movable axially relative to each drive member and on disengagement of the clutch when all the torque transmitting elements roll out of engagement with the abutments and move the drive members apart the cage is moved away from the other drive member.

11. A clutch as claimed in claim 10 wherein the cage is biased towards the other drive member by a combined cage and drive member biasing means which serves to bias the one drive member away from the other drive member when the clutch is disengaged.

12. A clutch according to claim 11 wherein the combined cage and drive member biasing means comprises an element which has the cage abutment means and an other drive member abutment means faced so that the other drive member abutment means can abut the other drive member when the clutch is disengaged and the torque transmitting elements are received within torque transmitting element receiving means with which the other drive member is provided.

13. A clutch as claimed in claim 1 wherein the drive member biasing means and the cage member biasing means are separate.

14. A clutch as claimed in claim 13 wherein the drive member biasing means acts between the one drive member and a part prevented at least from movement relative to the other drive member in a direction away from the one drive member.

15. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, a relieving means to relieve the fluid pressure of said biasing means, a cage to guide the torque transmitting elements, means to mount the cage between said drive members for free rotation relative thereto during disengagement of the clutch, (a) cage biasing means to bias the cage towards the other drive member and means to maintain the cage spaced further from one of said drive members when the clutch is disengaged than when the clutch is engaged and (b) drive member biasing means to move the drive members apart when the clutch is disengaged to provide a separation between the parts of the drive members which are engageable by the torque transmitting elements which is greater than the diameter of the torque transmitting elements to maintain the torque transmitting elements out of engagement with the torque transmitting abutments of said one drive member and adjacent the other drive member when the clutch is disengaged, wherein the one drive member is mounted for rotation relative to a longitudinal axis of a hub member and is prevented from movement longitudinally of said axis, the other drive member is non-rotatably mounted relative to said axis and is movable longitudinally of said axis and the fluid pressure biasing means is static and the hub member is rotatable relative to the fluid pressure biasing means and the cage and drive member biasing means act between the cage and at least one of (a) the hub member and (b) an element fixed relative thereto.

16. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, a relieving means to relieve the fluid pressure of said biasing means, a cage to guide the torque transmitting elements, means to mount the cage between said drive members for free rotation relative thereto during disengagement of the clutch, (a) means to maintain the cage spaced further from one of said drive members when the clutch is disengaged than when the clutch is engaged and (b) drive member biasing means to move the drive members apart when the clutch is disengaged to provide a separation between the parts of the drive members which are engageable by the torque transmitting elements which is greater than the diameter of the torque transmitting elements to maintain the torque transmitting elements out of engagement with the torque transmitting abutments of said one drive member when the clutch is disengaged, wherein the one drive member is mounted for rotation relative to a longitudinal axis of a hub member and is prevented from movement longitudinally of said axis, the other drive member is non-rotatably mounted relative to said axis and is moveable longitudinally of said axis, and the fluid pressure biasing means is static, and the hub member is rotatable relative to the fluid pressure biasing means and the drive member biasing means acts between the other drive member and at least one of (a) the hub member and (b) an element fixed relative thereto.

17. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, a relieving means to relieve the fluid pressure of said biasing means, a cage to guide the torque transmitting elements, means to mount the cage between said drive members for free rotation relative thereto during disengagement of the clutch,
(a) means to maintain the cage spaced further from one of said drive members when the clutch is disengaged than when the clutch is engaged and
(b) drive member biasing means to move the drive members apart when the clutch is disengaged to provide a separation between the parts of the drive members which are engageable by the torque transmitting elements which is greater than the diameter of the torque transmitting elements
to maintain the torque transmitting elements out of engagement with the torque transmitting abutments of said one drive member when the clutch is disengaged, wherein a first of said drive members is mounted for rotation relative to a longitudinal axis of a hub member and is prevented from movement longitudinally of said axis, the second of said drive members is non-rotatably mounted relative to said axis and is moveable longitudinally of said axis, the fluid pressure biasing means is static and the hub member is rotatable relative to the biasing means and to a static member, the static member having said first drive member rotatably mounted thereon.

18. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, when the torque exceeds a predetermined value as a result of movement of the drive members axially apart by the torque transmitting elements, a relieving means to relieve the fluid pressure of said biasing means, when the torque exceeds said predetermined value a cage to guide the torque transmitting elements, means to mount the cage between said drive members for free rotation relative thereto during disengagement of the clutch,
(a) means to maintain the cage spaced further from one of said drive members when the clutch is disengaged than when the clutch is engaged and
(b) drive member biasing means to move the drive members apart when the clutch is disengaged to provide a separation between the parts of the drive members which are engageable by the torque transmitting elements which is greater than the diameter of the torque transmitting elements
to maintain the torque transmitting elements out of engagement with the torque transmitting abutments of said one drive member when the clutch is disengaged, wherein the fluid pressure biasing means comprises
at least one piston movable in a cylinder and means to supply fluid under pressure to a chamber defined by said cylinder on one side of the piston, and
the relieving means comprises
a valve means connected in communication with said chamber and operable to relieve fluid pressure in said chamber as a result of relative movement of the drive member on disengagement of the clutch, wherein the valve means comprises a valve member co-operating with a valve seat and the valve member being movable by the piston to move the valve member out of sealing engagement with the valve seat to relieve the fluid pressure.

19. A clutch comprising a pair of relatively rotatable and axially movable drive members, each having torque transmitting abutments, a fluid pressure biasing means to bias the drive members axially towards each other so as to be disengagably connected in torque transmitting relationship by a plurality of rotatable torque transmitting elements interposed between the drive members and which are biased into torque transmitting relationship with the torque transmitting abutments by the biasing means when the clutch is engaged and which are movable out of torque transmitting relationship with the torque transmitting abutments, a relieving means to relieve the fluid pressure of said biasing means, said fluid pressure biasing means being static and said drive member being rotatable relative to said fluid pressure biasing means, a cage to guide the torque transmitting elements, means to mount the cage between said drive members for free rotation relative thereto during disengagement of the clutch;
(a) means to maintain the cage spaced further from one of said drive members when the clutch is disengaged than when the clutch is engaged and
(b) drive member biasing means to move the drive members apart when the clutch is disengaged to provide a separation between the parts of the drive members which are engagable by the torque transmitting elements which is greater than the diameter of the torque transmitting elements
to maintain the torque transmitting elements out of engagement with the torque transmitting abutments of said one drive member when the clutch is disengaged.

* * * * *